US 6,642,352 B2

(12) United States Patent
Suzuki et al.

(10) Patent No.: US 6,642,352 B2
(45) Date of Patent: Nov. 4, 2003

(54) METHOD OF MANUFACTURING MATERIAL FOR FORMING INSULATING FILM

(75) Inventors: Hidenori Suzuki, Mie (JP); Katsuyuki Kakinoki, Mie (JP); Yoshihisa Nakase, Mie (JP); Michinori Nishikawa, Ibaraki (JP); Takashi Okada, Ibaraki (JP); Kinji Yamada, Ibaraki (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/760,784

(22) Filed: Jan. 17, 2001

(65) Prior Publication Data

US 2001/0009936 A1 Jul. 26, 2001

(30) Foreign Application Priority Data

Jan. 17, 2000 (JP) .......................... 2000-007385
Jun. 12, 2000 (JP) .......................... 2000-175684

(51) Int. Cl.$^7$ .............................. C08F 6/00; C08J 3/00
(52) U.S. Cl. ..................... 528/502; 210/767; 525/326.1
(58) Field of Search .................. 525/326.1; 528/502; 210/767

(56) References Cited

U.S. PATENT DOCUMENTS

| 2,802,820 A | 8/1957 | Zech |
| 2,839,506 A | 6/1958 | Cooke et al. |
| 4,007,113 A | 2/1977 | Ostreicher |
| 4,684,697 A | * 8/1987 | Chang et al. ............... 525/100 |
| 5,212,050 A | * 5/1993 | Mier et al. .................. 430/320 |
| 5,869,549 A | 2/1999 | Christ et al. |

FOREIGN PATENT DOCUMENTS

| EP | 0 860 451 A1 | 8/1998 |
| EP | 0 989 457 A2 | 3/1999 |
| EP | 1 058 274 A1 | 12/2000 |
| EP | 1 090 967 A2 | 4/2001 |
| GB | 2 098 590 A | 11/1982 |
| JP | 63-17486 | 4/1988 |
| WO | WO 92/20438 | 11/1992 |

OTHER PUBLICATIONS

Patent Abstracts of Japan, vol. 1995, No. 01, Feb. 28, 1995, Publication No. 06287303.

* cited by examiner

Primary Examiner—James J. Seidleck
Assistant Examiner—U. K Rajguru
(74) Attorney, Agent, or Firm—Oblon, Spivak, McClelland, Maier & Neustadt, P.C.

(57) ABSTRACT

A method of manufacturing an insulating film-forming material comprising a curable composition comprisING (A) an inorganic polymer compound or an organic polymer compound and (B) an organic solvent, which comprises treating the curable composition with a zeta potential-producing filter material. Because the curable composition has a very small content of alkali metals and heavy metals, the composition is suitably used for the manufacture of materials for forming insulating films which have a wide variety of applications in the electronic field.

12 Claims, No Drawings

METHOD OF MANUFACTURING MATERIAL FOR FORMING INSULATING FILM

BACKGROUND OF THE INVENTION

1. Field of the Invention

The present invention relates to a method of manufacturing an insulating film-forming material.

2. Description of the Background Art

Curable compositions have a wide variety of applications in the electronic field. Because of miniaturization of devices used in the electronic field in recent years, the content of metallic impurities in the materials used for providing these devices with high electric performance must be controlled to a minimum level.

The requirement for controlling the content of metallic impurities to a minimum level is also applied to curable compositions used as a material in the electronic field.

One known method for removing or reducing metallic impurities, in materials for forming insulating films, is causing an ion-exchange resin to adsorb the metals.

However, the method of using ion-exchange resins has some problems such as difficulty in handling particulate ion-exchange resins, requirement of many steps for processing ion-exchange resins after adsorption of metals, such as reverse regeneration using an alkaline (or acidic) solution, regeneration using water and an acidic (or alkaline) solution, and the like.

An object of the present invention is therefore to present a method of manufacturing an insulating film-forming material with a reduced metal content from a curable composition which contains metals at a high efficiency.

As a result of extensive studies to solve the above problems in conventional technologies, the inventors of the present invention have found that the above problems can be solved by subjecting a curable composition or raw materials thereof or both to a filter processing.

SUMMARY OF THE INVENTION

Specifically, an object of the present invention is to provide a method of manufacturing an insulating film-forming material, comprising a curable composition which comprises (A) an inorganic polymer compound or an organic polymer compound and (B) an organic solvent, the method comprising treating the curable composition with a zeta potential-producing filter material.

In a preferred embodiment of the present invention, the zeta potential-producing filter material is the filter material selected from the group consisting of cotton, pulp, cellulose, diatomite, pearlite, activated carbon, and zeolite with a cation charge modifier added thereto.

In another preferred embodiment of the present invention, the zeta potential-producing filter material is used together with an ion exchanger material or a chelate-forming material, or both.

In still another preferred embodiment of the present invention, the inorganic polymer compound is a hydrolysis condensate of at least one compound selected from the compounds (A-1) and (A-2) which are respectively shown by the following formulas (1) or (2):

$$R^1{}_a Si(OR^2)_{4-a} \quad (1)$$

wherein $R^1$ is a hydrogen atom, fluorine atom, or monovalent organic group, $R^2$ is a monovalent organic group, and a is an integer from 0 to 2, $$R^3{}_b(R^4O)_{3-b}Si-(R^7)_d-Si(OR^5)_{3-c}R^6{}_c \quad (2)$$

wherein $R^3$, $R^4$, $R^5$, and $R^6$ individually represent a monovalent organic group, b and c individually represent an integer from 0 to 2, $R^7$ represents an oxygen atom or a group $-(CH_2)_n-$ (wherein n is an integer from 1 to 6), and d is 0 or 1.

In still another preferred embodiment of the present invention, the organic polymer compound is at least one compound selected from the group consisting of aromatic polyarylene compounds and aromatic polyarylene ether compounds.

In still another preferred embodiment of the present invention, the curable composition further comprises (C) a compound having a boiling point or decomposition temperature of 250–450° C.

In still another preferred embodiment of the present invention, the curable composition further comprises (D) a compound having a boiling point or decomposition temperature of above 450° C.

In still another preferred embodiment of the present invention, the curable composition further comprises (E) a surfactant.

The present invention further provides a method of manufacturing an insulating film-forming material comprising a curable composition which comprises (A) an inorganic polymer compound or an organic polymer compound and (B) an organic solvent, the method comprising:
  providing (A) the inorganic polymer compound or the organic polymer compound,
  treating the inorganic polymer compound or organic polymer compound with a zeta potential-producing filter material, and
  producing the curable composition from (A) the resulting polymer compound and (B) an organic solvent.

The present invention further provides a method of manufacturing an insulating film-forming material comprising a curable composition which comprises (A) an inorganic polymer compound or an organic polymer compound and (B) an organic solvent, the method comprising:
  providing raw materials for producing (A) the inorganic polymer compound or organic polymer compound,
  treating the raw materials with a zeta potential-producing filter material,
  producing (A) the inorganic polymer compound or organic polymer compound from the raw materials, and
  producing the curable composition from (A) the resulting polymer compound and (B) an organic solvent.

The present invention further provides a method of manufacturing an insulating film-forming material comprising,
  providing (B) an organic solvent,
  treating the organic solvent with a zeta potential-producing filter material, and
  producing a curable composition from the resulting an organic solvent and (A) an inorganic polymer compound or an organic polymer compound.

Other objects, features and advantages of the invention will hereinafter become more readily apparent from the following description.

DETAILED DESCRIPTION OF THE INVENTION AND PREFERRED EMBODIMENTS (Functional Filter Material)

As the zeta potential-producing filter material used in the present invention (hereinafter called "functional filter material"), filter materials causing a zeta potential to act on the liquid to be filtered are selected.

As examples of such a functional filter material, common filter materials such as cotton, pulp, cellulose, polyester, diatomite, pearlite, activated carbon, and zeolite with a cation charge modifier added thereto are given. Of these, filter materials comprising cotton, cellulose, polyester, activated carbon, and zeolite are preferable.

The addition of a cation charge modifier provides the filter material with cation charges which produce a zeta potential between the filter material and charged materials in the liquid passing through the filter material, specifically, metal components.

As a cation charge modifier, the reaction product of dicyandiamide, monoethanolamine, and formaldehyde described in U.S. Pat. No. 2,802,820, the aminotriazine resin described in U.S. Pat. No. 2,839,506, the melamine-formaldehyde cationic resin described in U.S. Pat. No. 4,007,113, the resin obtained by the reaction of N,N'-diethanolpiperazine, melamine, formalin, and glycerol phthalic acid ester described in Japanese Patent Publication 20045/1961, the polyamide polyamine epichlorohydrin cationic resin described in Japanese Patent Publication 17486/1988, and the like can be given. Of these, the polyamide polyamine epichlorohydrin cationic resin is preferable in view of its capability of providing stable cationic charges.

The above Japanese Patent Publication 17486/1988 describes a method of manufacturing a functional filter made from cellulose, diatomite, or pearlite by using the polyamide polyamine epichlorohydrin cationic resin as the cation charge modifier.

The thickness of the functional filter material used in the present invention is preferably less than 10 cm, and more preferably 0.01–10 cm.

In one preferable embodiment of the functional filter material of the present invention, the filter material is used together with an ion exchanger material or a chelate-forming material, or both.

The ion exchanger material and chelate-forming material in the present invention are polymers, such as a styrene polymer, acrylic polymer, methacrylic polymer, vinyl alcohol polymer, polyester, or cellulose, with an ion exchanging functional group or a chelate-forming functional group introduced therein.

The form of ion exchanger materials and chelate-forming materials is not specifically limited. They may be used in the form of particles, fibers, or a porous film (hereinafter referred to simply as "film"), usually in the form of particles.

More specifically, a strongly acidic cation exchanger material, weakly acidic cation exchanger material, strongly basic anion exchanger material, or weakly basic anion exchanger material in the form of particles, fibers, or a film may be used.

As a strongly acidic cation exchanger material, a sulfonated product of styrene polymer crosslinked with divinylbenzene, carboxylated methacrylate polymer, and the like can be given. As a weakly acidic cation exchanger material, a copolymer of acrylic acid or methacrylic acid crosslinked with divinylbenzene can be given. As a strongly basic anion exchanger material, an anion exchanger material produced from a styrene copolymer crosslinked with divinylbenzene by aminometyhylation and quaternarization can be given, for example. As a weakly basic anion exchanger material, an anion exchanger material produced from a styrene copolymer crosslinked with divinylbenzene by aminometyhylation, an aminomethyl group-containing acrylamide copolymer crosslinked with divinylbenzene, and the like can be given.

As a chelate-forming material, a particulate, fibrous, or film-like resin produced by introducing a group having an imino diacetic acid structure or a group having a polyamine structure into a styrene copolymer crosslinked with divinylbenzene can be given, for example. Either one type or two or more types of these ion exchanger materials or chelate-forming materials may be contained in one functional filter material.

The ion exchanger materials and chelate-forming materials may form the functional filter material together either in the form of a mixture of these and the functional filter material or layers of the ion exchanger materials and chelate-forming materials may be arranged in juxtaposition with the functional filter material. In the later case, part of the materials in the arranged layers may be mixed in the interface.

The functional filter material has a pore diameter of 0.05 to 10.0 $\mu$m, and preferably 0.1 to 1.0 $\mu$m. Metal impurities having a size smaller than the pore diameter of the functional filter material can be removed by the filter because the particles of impurities in a liquid is electrically charged due to the electric potential difference generated and adsorbed by the functional filter material when the liquid passes through the filter. Some metal impurities which are present in a very small amount form fine particles such as a micro gel which are removed by a zeta potential-producing filter. On the other hand, the exchanger materials and chelate-forming materials mainly collect free ions which are present in a solution. As a result, the method of the present invention can remove a wide variety of metal impurities which are present in the filtered materials in various different forms. Therefore, combined use of ion exchanger/chelate-forming materials with the functional filter material ensures efficient removal of metal impurities from a curable resin or the raw materials.

Various commercially-available functional filter materials may be used for the method of the present invention. Of these, Zeta-Plus SH™ series products manufactured by CUNO Kabushiki Kaisha are given as preferable zeta potential-producing filters containing an ion exchanger material or chelate-forming material, and Zeta-Plus GN™ series products and Zeta-Plus LA™ series products manufactured by CUNO Kabushiki Kaisha are given as zeta potential-producing filters not containing an ion exchanger material or chelate-forming material.

(Curable Composition)

The curable composition of the present invention comprises (A) an inorganic polymer compound or an organic polymer compound and (B) an organic solvent.

As the inorganic polymer compound, a hydrolysis condensate of at least one compound selected from the group consisting of the following compounds (A-1) and (A-2) can be given.

  (1)

wherein $R^1$ is a hydrogen atom, fluorine atom, or monovalent organic group, $R^2$ is a monovalent organic group, and a is an integer from 0 to 2,

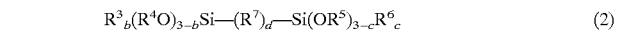  (2)

wherein $R^3$, $R^4$, $R^5$, and $R^6$ individually represent a monovalent organic group, b and c individually represent an integer from 0 to 2, $R^7$ represents an oxygen atom or a group —$(CH_2)_n$— (wherein n is an integer from 1 to 6), and d is 0 or 1.

Component (A)

Component (A-1)

As a monovalent organic group represented by $R^1$ and $R^2$ in the above formula (1), an alkyl group, aryl group, allyl group, glycidyl group, and the like can be given. As $R^1$ in the formula (1), a monovalent organic group, particularly an alkyl group and phenyl group, are preferable.

The alkyl groups having 1–5 carbon atoms such as a methyl group, ethyl group, propyl group, butyl group, and the like are preferably used. These alkyl groups may be either linear or branched, or may be substituted by a hydrogen atom or a fluorine atom.

As aryl groups used in the formula (1), a phenyl group, naphthyl group, methylphenyl group, ethyl phenyl group, chlorophenyl group, bromophenyl group, fluorophenyl group, and the like can be given.

The following compounds are given as specific examples of the compounds represented by the formula (1) trimethoxysilane, triethoxysilane, tri-n-propoxysilane, tri-iso-propoxysilane, tri-n-butoxysilane, tri-sec-butoxysilane, tri-tert-butoxysilane, triphenoxysilane, fluorotrimethoxysilane, fluorotriethoxysilane, fluorotri-n-propoxysilane, fluorotri-iso-propoxysilane, fluorotri-n-butoxysilane, fluorotri-sec-butoxysilane, fluorotri-tert-butoxysilane, fluorotriphenoxysilane, tetramethoxysilane, tetraethoxysilane, tetra-n-propoxysilane, tetra-iso-propoxysilane, tetra-n-butoxysilane, tetra-sec-butoxysilane, tetra-tert-butoxysilane, tetraphenoxysilane, methyltrimethoxysilane, methyltriethoxysilane, methyltri-n-propoxysilane, methyltri-iso-propoxysilane, methyltri-n-butoxysilane, methyltri-sec-butoxysilane, methyltri-tert-butoxysilane, methyltriphenoxysilane, ethyltrimethoxysilane, ethyltriethoxysilane, ethyltri-n-propoxysilane, ethyltri-iso-propoxysilane, ethyltri-n-butoxysilane, ethyltri-sec-butoxysilane, ethyltri-tert-butoxysilane, ethyltriphenoxysilane, vinyltrimethoxysilane, vinyltriethoxysilane, vinyltri-n-propoxysilane, vinyltri-iso-propoxysilane, vinyltri-n-butoxy silane, vinyltri-sec-butoxysilane, vinyltri-tert-butoxysilane, vinyltriphenoxysilane, n-propyltrimethoxysilane, n-propyltriethoxysilane, n-propyltri-n-propoxysilane, n-propyltri-iso-propoxysilane, n-propyltri-n-butoxysilane, n-propyltri-sec-butoxysilane, n-propyltri-tert-butoxysilane, n-propyltriphenoxysilane, i-propyltrimethoxysilane, i-propyltriethoxysilane, i-propyltri-n-propoxy silane, i-propyltri-iso-propoxysilane, i-propyltri-n-butoxysilane, i-propyltri-sec-butoxysilane, i-propyltri-tert-butoxysilane, i-propyltriphenoxysilane, n-butyltrimethoxysilane, n-butyltriethoxysilane, n-butyltri-n-propoxysilane, n-butyltri-iso-propoxysilane, n-butyltri-n-butoxysilane, n-butyltri-sec-butoxysilane, n-butyltri-tert-butoxysilane, n-butyltriphenoxysilane, sec-butyltrimethoxysilane, sec-butyl-i-triethoxysilane, sec-butyl-tri-n-propoxysilane, sec-butyl-tri-iso-propoxysilane, sec-butyl-tri-n-butoxysilane, sec-butyl-tri-sec-butoxysilane, sec-butyl-tri-tert-butoxysilane, sec-butyl-triphenoxysilane, t-butyltrimethoxysilane, t-butyltriethoxysilane, t-butyltri-n-propoxysilane, t-butyltri-iso-propoxysilane, t-butyltri-n-butoxysilane, t-butyltri-sec-butoxysilane, t-butyltri-tert-butoxysilane, t-butyltriphenoxysilane, phenyltrimethoxysilane, phenyltriethoxysilane, phenyltri-n-propoxy silane, phenyltri-iso-propoxysilane, phenyltri-n-butoxysilane, phenyltri-sec-butoxysilane, phenyltri-tert-butoxysilane, phenyltriphenoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-trifluoropropyltrimethoxysilane, γ-trifluoropropyltriethoxysilane, dimethyldimethoxysilane, dimethyldiethoxysilane, dimethyl-di-n-propoxysilane, dimethyl-di-iso-propoxysilane, dimethyl-di-n-butoxysilane, dimethyl-di-sec-butoxysilane, fimethyl-di-tert-butoxysilane, dimethyldiphenoxysilane, diethyldimethoxysilane, diethyldiethoxysilane, diethyl-di-n-propoxysilane, diethyl-di-iso-propoxysilane, diethyl-di-n-butoxysilane, diethyl-di-sec-butoxysilane, diethyl-di-tert-butoxysilane, diethyl-di-phenoxysilane, di-n-propyldimethoxysilane, di-n-propyldiethoxysilane, di-n-propyl-di-n-propoxysilane, di-n-propyl-di-iso-propoxysilane, di-n-propyl-di-n-butoxysilane, di-n-propyl-di-sec-butoxysilane, di-n-propyl-di-tert-butoxysilane, di-n-propyl-di-phenoxysilane, di-iso-propyldimethoxysilane, di-iso-propyldiethoxysilane, di-iso-propyl-di-n-propoxysilane, di-iso-propyl-di-iso-propoxysilane, di-iso-propyl-di-n-butoxysilane, di-iso-propyl-di-sec-butoxysilane, di-iso-propyl-di-tert-butoxysilane, di-iso-propyl-di-phenoxysilane, di-n-butyldimethoxysilane, di-n-butyldiethoxysilane, di-n-butyl-di-n-propoxysilane, di-n-butyl-di-iso-propoxysilane, di-n-butyl-di-n-butoxysilane, di-n-butyl-di-sec-butoxysilane, di-n-butyl-di-tert-butoxysilane, di-n-butyl-di-phenoxysilane, di-sec-butyldimethoxysilane, di-sec-butyldiethoxysilane, di-sec-butyl-di-n-propoxysilane, di-sec-butyl-di-iso-propoxysilane, di-sec-butyl-di-n-butoxysilane, di-sec-butyl-di-se-butoxysilane, di-sec-butyl-di-tert-butoxysilane, di-sec-butyl-di-phenoxysilane, di-tert-butyldimethoxysilane, di-tert-butyldiethoxysilane, di-tert-butyl-di-n-propoxysilane, di-tert-butyl-di-iso-propoxysilane, di-tert-butyl-di-n-butoxysilane, di-tert-butyl-di-sec-butoxysilane, di-tert-butyl-di-tert-butoxysilane, di-tert-butyl-di-phenoxysilane, diphenyldimethoxysilane, diphenyl-di-ethoxysilane, diphenyl-di-n-propoxysilane, diphenyl-di-iso-propoxysilane, diphenyl-di-n-butoxysilane, diphenyl-di-sec-butoxysilane, diphenyl-di-tert-butoxysilane, diphenyldiphenoxysilane, divinyltrimethoxysilane, γ-aminopropyltrimethoxysilane, γ-aminopropyltriethoxysilane, γ-glycidoxypropyltrimethoxysilane, γ-glycidoxypropyltriethoxysilane, γ-trifluoropropyltrimethoxysilane, γ-trifluoropropyltriethoxysilane, and the like.

Of these preferable compounds are tetramethoxysilane, tetraethoxysilane, tetra-n-propoxysilane, tetra-iso-propoxysilane, tetraphenoxysilane, methyltrimethoxysilane, methyltriethoxysilane, methyltri-n-propoxysilane, methyltri-iso-propoxysilane, ethyltrimethoxysilane, ethyltriethoxysilane, vinyltrimethoxysilane, vinyltriethoxysilane, phenyltrimethoxysilane, phenyltriethoxysilane, dimethyldimethoxysilane, dimethyldiethoxysilane, diethyldimethoxysilane, diethyldiethoxysilane, diphenyldimethoxysilane, diphenyldiethoxysilane, trimethylmonomethoxysilane, trimethylmonoethoxysilane, triethylmonomethoxysilane, triethylmonoethoxysilane, triphenylmonomethoxysilane, and triphenylmonoethoxysilane.

These compounds may be used either individually or in combination of two or more.

Component (A-2)

As examples of the monovalent organic groups in the above formula (2), the same groups as given for the organic groups in the above formula (1) can be given.

As divalent organic groups represented by $R^7$ in the formula (2), a methylene group and alkylene groups having 2–6 carbon atoms can be given.

As examples of the compounds having an oxygen atom for $R^7$ in the formula (2) hexamethoxydisiloxane, hexaethoxydisiloxane, hexaphenoxydisiloxane, 1,1,1,3,3-pentamethoxy-3-methyldisiloxane, 1,1,1,3,3-pentaethoxy-3-methyldisiloxane, 1,1,1,3,3-pentamethoxy-3-phenyldisiloxane, 1,1,1,3,3-pentaethoxy-3-phenyldisiloxane, 1,1,3,3-tetramethoxy-1,3-dimethyldisiloxane, 1,1,3,3-tetraethoxy-1,3-dimethyldisiloxane, 1,1,3,3-tetramethoxy-1,3-diphenyldisiloxane, 1,1,3,3-tetraethoxy-1,3-diphenyldisiloxane, 1,1,3-trimethoxy-1,3,3-trimethyldisiloxane, 1,1,3-triethoxy-1,3,3-trimethyldisiloxane, 1,1,3-trimethoxy-1,3,3- triphenyldisiloxane, 1,1,3-triethoxy-1,3,3-triphenyldisiloxane, 1,3-dimethoxy-1,1,3,3-tetramethyldisiloxane, 1,3-diethoxy-1,1,3,3-tetramethyldisiloxane, 1,3-dimethoxy-1,1,3,3-tetraphenyldisiloxane, and 1,3-diethoxy-1,1,3,3-tetraphenyldisiloxane can be given.

Of these, preferable compounds are hexamethoxydisiloxane, hexaethoxydisiloxane, 1,1,3,3-tetramethoxy-1,3-dimethyldisiloxane, 1,1,3,3-tetraethoxy-1,3-dimethyldisiloxane, 1,1,3,3-tetramethoxy-1,3-diphenyldisiloxane, 1,3-dimethoxy-1,1,3,3-tetramethyldisiloxane, 1,3-diethoxy-1,1,3,3-tetramethyldisiloxane, 1,3-dimethoxy-1,1,3,3-tetraphenyldisiloxane, 1,3-diethoxy-1,1,3,3-tetraphenyldisiloxane, and the like.

As examples of the compounds having d=0 in the formula (2), hexamethoxydisilane, hexaethoxydisilane, hexaphenoxydisilane, 1,1,1,2,2-pentamethoxy-2-methyldisilane, 1,1,1,2,2-pentaethoxy-2-methyldisilane, 1,1,1,2,2-pentamethoxy-2-phenyldisilane, 1,1,1,2,2-pentaethoxy-2-phenyldisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,1,2-trimethoxy-1,2,2-trimethyldisilane, 1,1,2-triethoxy-1,2,2-trimethyldisilane, 1,1,2-trimethoxy-1,2,2-triphenyldisilane, 1,1,2-triethoxy-1,2,2-triphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, and 1,2-diethoxy-1,1,2,2-tetraphenyldisilane can be given.

As examples of the compounds having $R^7=-(CH_2)-$ in the formula (2), bis(hexamethoxysilyl)methane, bis(hexaethoxysilyl)methane, bis(hexaphenoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, bis(ethoxydiphenylsilyl)methane, bis(hexamethoxysilyl)ethane, bis(hexaethoxysilyl)ethane, bis(hexaphenoxysilyl)ethane, bis(dimethoxymethylsilyl)ethane, bis(diethoxymethylsilyl)ethane, bis(dimethoxyphenylsilyl)ethane, bis(diethoxyphenylsilyl)ethane, bis(methoxydimethylsilyl)ethane, bis(ethoxydimethylsilyl)ethane, bis(methoxydiphenylsilyl)ethane, bis(ethoxydiphenylsilyl)ethane, 1,3-bis(hexamethoxysilyl)propane, 1,3-bis(hexaethoxysilyl)propane, 1,3-bis(hexaphenoxysilyl)propane, 1,3-bis(dimethoxymethylsilyl)propane, 1,3-bis(diethoxymethylsilyl)propane, 1,3-bis(dimethoxyphenylsilyl)propane, 1,3-bis(diethoxyphenylsilyl)propane, 1,3-bis(methoxydimethylsilyl)propane, 1,3-bis(ethoxydimethylsilyl)propane, 1,3-bis(methoxydiphenylsilyl)propane, and 1,3-bis(ethoxydiphenylsilyl)propane can be given. Of these, hexamethoxydisilane, hexaethoxydisilane, hexaphenoxydisilane, 1,1,2,2-tetramethoxy-1,2-dimethyldisilane, 1, 1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, 1,2-diethoxy-1,1,2,2-tetraphenyldisilane, bis(hexamethoxysilyl)methane, bis(hexaethoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, bis(ethoxydiphenylsilyl)methane, and the like are preferable.

In the present invention, both the above components (A-1) and (A-2) or either one of them may be used as the component (A), and the compounds belonging to the components (A-1) or (A-2) may be used either individually or in combination of two or more.

Hydrolysis in the present invention does not necessarily require hydrolysis of all of the groups $R^2O-$, $R^4O-$, and $R^5O-$, but the hydrolysis reaction products may include the compounds with one of the groups hydrolyzed, the compounds with two or more of the groups hydrolyzed, and a mixture of these compounds.

In the present invention, "condensation" means condensation of silanol groups in the hydrolyzates to form Si—O—Si bonds. The condensation products in the present invention do not necessarily have all silanol groups condensed, but include compounds in which only a small amount of silanol groups are condensed and a mixture of compounds with a different degree of condensation.

The polystyrene-reduced weight average molecular weight of the hydrolysis condensate of the component (A) is usually in the range of 1,000 to 10,000,000.

A solution which contains an aromatic polyarylene and an aromatic polyarylene ether is used as the organic polymer compound in the present invention.

As examples of the aromatic polyarylene and aromatic polyarylene ether, compounds shown by the following formulas (3) and (4), SiLK™ (manufactured by Dow Chemical Company), and FLARE™ (manufactured by Honeywell Company) can be given.

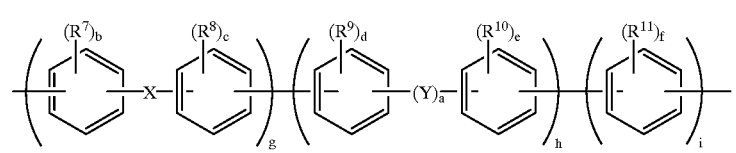

(3)

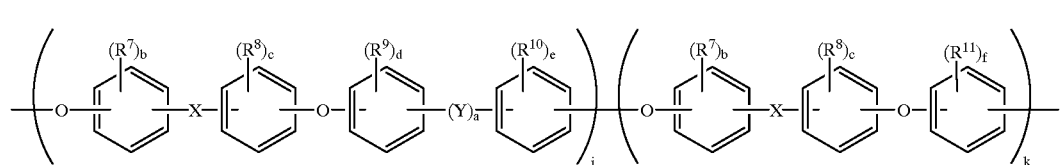

(4)

wherein $R^7$ to $R^{11}$ individually represent a hydrocarbon group having 1–20 carbon atoms, phenyl group, cyano group, nitro group, alkoxyl group having 1–20 carbon atoms, or halogen atom; X is a group —CQQ'— (wherein Q and Q' individually represent an alkyl halide group, alkyl group, hydrogen atom, halogen atom, or aryl group), or a fluorenine group; Y is a group —O—, —CO—, —COO—, —CONH—, —S—, —SO$_2$—, or a phenylene group; a is 0 or 1; b to f individually indicate an integer from 0 to 4; g is 5–100 mol %, h is 0–95mol %, and i is 0–95mol % (provided that g+h+i=100 mol %); and j is 0–100 mol % and k is 0–100 mol % (provided that j+k=100 mol %).

(B) Organic Solvent

The following solvents are given as examples of the organic solvent used in the present invention: aliphatic hydrocarbon solvents such as n-pentane, i-pentane, n-hexane, i-hexane, n-heptane, i-heptane, 2,2,4-trimethylpentane, n-octane, i-octane, cyclohexane, and methylcyclohexane; aromatic hydrocarbon solvents such as benzene, toluene, xylene, ethylbenzene, trimethylbenzene, methylethylbenzene, n-propylebenzene, i-propylebenzene, and diethylbenzene; monohydric alcohols such as methanol, ethanol, n-propanol, i-propanol, n-butanol, i-butanol, sec-butanol, t-butanol, n-pentanol, i-pentanol, 2-methylbutanol, sec-pentanol, t-pentanol, 3-methoxybutanol, n-hexanol, 2-methylpentanol, sec-hexanol, 2-ethylbutanol, sec-heptanol, heptanol-3, n-octanol, 2-ethylhexanol, sec-octanol, n-nonyl alcohol, 2,6-dimethylheptanol-4, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethyl-cyclohexanol, benzyl alcohol, phenylmethylcarbinol, diacetone alcohol, and cresol; polyhydric alcohols such as ethylene glycol, 1,2-polyethylene glycol, 1,3-butylene glycol, pentanediol-2,4, 2-methylpentanediol-2,4, hexanediol-2,5, heptanediol-2,4, 2-ethylhexanediol-1,3, diethylene glycol, dipropylene glycol, triethylene glycol, tripropylene glycol, and glycerol; ketones such as acetone, methyl ethyl ketone, methyl n-propyl ketone, methyl n-butyl ketone, diethyl ketone, methyl i-butyl ketone, methyl n-pentyl ketone, ethyl n-butyl ketone, methyl n-hexyl ketone, di-i-butyl ketone, trimethylenonane, cyclohexanone, methyl cyclohexanone, 2,4-pentane dione, acetonyl acetone, diacetone alcohol, acetophenone, abd fenchone; ethers such as ethyl ether, i-propyl ether, n-butyl ether, n-hexyl ether, 2-ethylhexyl ether, ethylene oxide, 1,2-propylene oxide, dioxolane, 4-methyl dioxolane, dioxane, dimethyl dioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycolmono-2-ethylbutyl ether, ethylene glycol dibutyl ether, diethylene glycol monomethyl ether, diethylene glycol monoethyl ether, diethylene glycol diethyl ether, diethylene glycol mono-n-butyl ether, diethylene glycol di-n-butyl ether, diethylene glycol mono-n-hexyl ether, ethoxy triglycol, tetraethylene glycol di-n-butyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, tripropylene glycol monomethyl ether, tetrahydrofuran, and 2-methyltetrahydrofuran; ester solvents such as diethyl carbonate, methyl acetate, ethyl acetate, γ-butyrolactone, γ-valerolactone, N-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxy triglycol acetate, ethyl propionate, n-butylpropionate, i-amyl propionate, diethyl oxalate, di-n-butyl oxalate, methyl lactate, ethyl lactate, n-butyl lactate, n-amyl lactate, diethyl malonate, dimethyl phthalate, and diethyl phthalate; nitrogen-containing solvents such as N-methylformamide, N,N-dimethylformamide, N,N-dimethylformamide, acetamide, N-methylacetamide, N,N-dimethylacetamide, N-methylpropioneamide, and N-methylpyrrolidone; and sulfur-containing solvents such as diethyl sulfide, thiophene, tetrahydrothiophene, dimethylsulfoxide, sulfolane, and 1,3-propanesultone; These solvents may be used either individually or in combination of two or more.

In the present invention, it is particularly preferable to use an organic solvent having a boiling point lower than 250° C. Specific examples are alcohols such as methanol, ethanol, and iso-propanol; polyhydric alcohols such as ethylene glycol and glycerol; glycol ether solvents such as ethylene glycol monomethyl ether, ethylene glycol monobutyl ether, diethylene glycol monoethyl ether, diethylene glycol diethyl ether, propylene glycol monopropyl ether, and dipropylene glycol monoethyl ether; glycol acetate solvents such as ethylene glycol monomethyl acetate, diethylene glycol monobutyl ether acetate, ethylene glycol diacetate, propylene glycol methylether acetate; amide solvents such as N,N-dimethylacetamide, N,N-dimethylformamide, and N-methyl-2-pyrrolidone; ketone solvents such as acetone, methyl ethyl ketone, methyl isobutyl ketone, acetylacetone, and methyl amyl ketone; and carboxylic acid esters such as ethyl lactate, methoxy methyl propionate, and ethoxyethyl propionate. These solvents may be used either individually or in combination of two or more.

The amount of the organic solvents used in the present invention is in the range of 0.3 to 25 times by weight of the total of the component (A) (as a completely hydrolyzed condensate when the compound (A-1) or compound (A-2) is used) and the component (B).

When the compound (A-1) or compound (A-2) is used, a catalyst may be used in the present invention in addition to the components (A) and (B).

Organic acids, inorganic acids, organic bases, inorganic bases, and metal chelates are used as the catalyst in the present invention.

As examples of the organic acids, acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linolic acid, linoleic acid, salicylic acid, benzoic acid, p-aminobenzoic acid, p-toluenesulfonic acid, benzene-sulfonic acid, monochloroacetic acid, dichloroacetic acid, trichloroacetic acid, trifluoroacetic acid, formic acid, malonic acid, sulfonic acid, phthalic acid, fumaric acid, citric acid, and tartaric acid can be given.

As examples of the inorganic bases, hydrochloric acid, nitric acid, sulfuric acid, hydrofluoric acid, and phosphoric acid can be given.

As examples of the organic bases, pyridine, pyrrole, piperazine, pyrrolidine, piperidine, picoline, trimethylamine, triethylamine, monoethanolamine, diethanolamine, dimethyl monoethanolamine, monomethyl diethanolamine, triethanolamine, diazabicyclooctane, diazabicyclononane, diazabicycloundecene, and tetramethylammonium hydroxide can be given.

As examples of the inorganic bases, ammonia, sodium hydroxide, potassium hydroxide, barium hydroxide, and calcium hydroxide can be given.

Moreover, metallic chelate compounds may be added to the composition of the present invention.

The following compounds are given as examples of the represented by the metallic chelate compounds: titanium chelate compounds such as triethoxy•mono(acetylacetonate) titanium, tri-n-propoxy•mono(acetylacetonate) titanium, tri-i-propoxy•mono(acetylacetonate) titanium, tri-n-butoxy•mono(acetylacetonate) titanium, tri-sec-butoxy•mono(acetylacetonate) titanium, tri-t-butoxy•mono(acetylacetonate) titanium, diethoxy•bis(acetylacetonate) titanium, di-n-propoxy•bis(acetylacetonate) titanium, di-i-propoxy•bis(acetylacetonate) titanium, di-n-butoxy•bis(acetylacetonate) titanium, di-sec-butoxy•bis(acetylacetonate) titanium, di-t-butoxy•bis(acetylacetonate) titanium, monoethoxy•tris(acetylacetonate) titanium, mono-n-propoxy•tris(acetylacetonate) titanium, mono-i-propoxy•tris(acetylacetonate) titanium, mono-n-butoxy•tris(acetylacetonate) titanium, mono-sec-butoxy•tris(acetylacetonate) titanium, mono-t-butoxy•tris(acetylacetonate) titanium, tetrakis(acetylacetonate) titanium, triethoxy•mono(ethylacetoacetate) titanium, tri-n-propoxy•mono(ethyl acetoacetate) titanium, tri-i-propoxy•mono(ethylacetoacetate) titanium, tri-n-butoxy•mono(ethylacetoacetate) titanium, tri-sec-butoxy•mono(ethylacetoacetate) titanium, tri-t-butoxy•mono(ethylacetoacetate) titanium, diethoxy•bis(ethylacetoacetate) titanium, di-n-propoxy•bis(ethylacetoacetate) titanium, di-i-propoxy•bis(ethylacetoacetate) titanium, di-n-butoxy•bis(ethylacetoacetate) titanium, di-sec-butoxy•bis(ethylacetoacetate) titanium, di-t-butoxy•bis(ethylacetoacetate) titanium, monoethoxy•tris(ethylacetoacetate) titanium, mono-n-propoxy•tris(ethylacetoacetate) titanium, mono-i-propoxy•tris(ethylacetoacetate) titanium, mono-n-butoxy•tris(ethylacetoacetate) titanium, mono-sec-butoxy•tris(ethylacetoacetate) titanium, mono-t-butoxy•tris(ethylacetoacetate) titanium, tetrakis(ethylacetoacetate) titanium, mono(acetylacetonate) tris(ethylacetoacetate) titanium, bis(acetylacetonate) bis(ethylacetoacetate) titanium, and tris(acetylacetonate) mono(ethylacetoacetate) titanium; zirconium chelate compounds such as triethoxy•mono(acetylacetonate) zirconium, tri-n-propoxy•mono(acetylacetonate) zirconium, tri-i-propoxy•mono(acetylacetonate) zirconium, tri-n-butoxy•mono(acetylacetonate) zirconium, tri-sec-butoxy•mono(acetylacetonate) zirconium, tri-t-butoxy•mono(acetylacetonate) zirconium, di ethoxy•bis(acetylacetonate) zirconium, di-n-propoxy•bis(acetylacetonate) zirconium, di-i-propoxy•bis(acetylacetonate) zirconium, di-n-butoxy•bis(acetylacetonate) zirconium, di-sec-butoxy•bis(acetylacetonate) zirconium, di-t-butoxy•bis(acetylacetonate) zirconium, monoethoxy•tris(acetylacetonate) zirconium, mono-n-propoxy tris(acetylacetonate) zirconium, mono-i-propoxy•tris(acetylacetonate) zirconium, mono-n-butoxy•tris(acetylacetonate) zirconium, mono-sec-butoxy•tris(acetylacetonate) zirconium, mono-t-butoxy•tris(acetylacetonate) zirconium, tetrakis(acetylacetonate) zirconium, triethoxy•mono(ethylacetoacetate) zirconium, tri-n-propoxy•mono(ethylacetoacetate) zirconium, tri-i-propoxy•mono(ethylacetoacetate) zirconium, tri-n-butoxy•mono(ethylacetoacetate) zirconium, tri-sec-butoxy•mono(ethylacetoacetate) zirconium, tri-t-butoxy•mono(ethylacetoacetate) zirconium, diethoxy•bis(ethylacetoacetate) zirconium, di-n-propoxy•bis(ethylacetoacetate) zirconium, di-i-propoxy•bis(ethylacetoacetate) zirconium, di-n-butoxy•bis(ethylacetoacetate) zirconium, di-sec-butoxy•bis(ethylacetoacetate) zirconium, di-t-butoxy•bis(ethylacetoacetate) zirconium, monoethoxy•tris(ethylacetoacetate) zirconium, mono-n-propoxy•tris(ethylacetoacetate) zirconium, mono-i-propoxy•tris(ethylacetoacetate) zirconium, mono-n-butoxy•tris(ethylacetoacetate) zirconium, mono-sec-butoxytris(ethylacetoacetate) zirconium, mono-t-butoxy•tris(ethylacetoacetate) zirconium, tetrakis(ethylacetoacetate) zirconium, mono(acetylacetonate) tris(ethylacetoacetate) zirconium, bis(acetylacetonate) bis(ethylacetoacetate) zirconium, and tris(acetylacetonate) mono(ethylacetoacetate) zirconium; and aluminum chelate compounds such as tris(acetylacetonate) aluminum and tris(ethylacetoacetate) aluminum.

The amount of the catalyst used is usually 0.0001–1 mol, and preferably 0.001–0.1 mol, for one mol of the total amount of the compound (A-1) and the compound (A-2).

The curable composition in the present invention may further comprises (C) a compound having a boiling point or decomposition temperature of 250–450° C. As specific examples of such a compound, (1) a compound having a polyalkylene oxide structure, (2) (meth)acrylate polymer, (3) polyester, (4) polycarbonate, and (5) polyanhydride can be given.

In the present invention, the boiling point and decomposition temperature is indicated by a temperature under atmospheric pressure.

(1) Compound Having a Polyalkylene Oxide Structure

As the polyalkylene oxide structure, a polyethylene oxide structure, polypropylene oxide structure, polytetramethylene oxide structure, polybutylene oxide structure, and the like can be given.

Specific examples of the compound having a polyalkylene oxide structure include ether compounds such as polyoxyethylene alkyl ether, polyoxyethylene alkylphenyl ether, polyoxyethylene sterol ether, polyoxyethylene lanolin derivatives, ethylene oxide derivatives of alkylphenol formalin condensate, polyoxyethylene polyoxypropylene block copolymers, and polyoxyethylene polyoxypropylene alkyl ethers; ether-ester compounds such as polyoxyethylene glyceride, polyoxyethylene sorbitan fatty acid ester, polyoxyethylene sorbitol fatty acid ester, and polyoxyethylene fatty acid alkanolamide sulfate; and ester compounds such as polyethylene glycol fatty acid ester, ethylene glycol fatty acid ester, fatty acid monoglyceride, polyglycerol fatty acid ester, sorbitan fatty acid ester, propylene glycol fatty acid ester, and sucrose fatty acid ester.

As a polyoxyethylene polyoxypropylene block copolymer, the compounds having the following block structures can be given:

—(A)n—(B)m—,

—(A)n—(B)m—(A)l—, wherein A indicates a group —CH$_2$CH$_2$O—, B indicates a group —CH$_2$CH(CH$_3$)O—, and n is a number from 1 to 90, m is a number from 10 to 90, l is a number from 0 to 90.

(2) (Meth)acrylic Polymer

As the acrylic acid ester and methacrylic acid ester forming the (meth)acrylic polymer in the present invention, acrylic acid alkyl esters, methacrylic acid alkyl esters, acrylic acid alkoxyalkyl esters, methacrylic acid alkoxyalkyl esters, and the like can be given.

As specific examples of the acrylic acid alkyl ester, alkyl esters having 1–6 carbon atoms such as methyl acrylate, ethyl acrylate, n-propyl acrylate, isopropyl acrylate, n-butyl acrylate, isobutyl acrylate, pentyl acrylate, and hexyl acrylate can be given. As specific examples of the methacrylic acid alkyl ester, alkyl esters having 1–6 carbon atoms such as methyl methacrylate, ethyl methacrylate, n-propyl methacrylate, isopropyl methacrylate, n-butyl methacrylate, isobutyl methacrylate, butyl methacrylate, pentyl methacrylate, and hexyl methacrylate can be given. As acrylic acid alkoxyalkyl esters, methoxymethyl acrylate, ethoxyethyl acrylate, and the like can be given. As methacrylic acid alkoxyalkyl esters, methoxymethyl methacrylate, ethoxyethyl methacrylate, and the like can be given.

Of these, methacrylic acid alkyl esters are preferable. Particularly preferable methacrylic acid alkyl esters are ethyl methacrylate, isobutyl methacrylate, and the like.

In the present invention, it is preferable that the (meth)acrylate polymer is a copolymer of the above monomers and a monomer having an alkoxysilyl group.

As a monomer having an alkoxysilyl group, 3-(trimethoxysilyl)propyl methacrylate, 3-(triethoxysilyl)propyl methacrylate, 3-[tri(methoxyethoxy)silyl]propyl methacrylate, 3-(methyldimethoxysilyl)propyl methacrylate, 3-(methyldiethoxysilyl)propyl methacrylate, and the like can be given.

The content of the monomer having an alkoxysilyl group in the total monomers for forming the acrylic copolymer is 0.5–10 mol %, and preferably 1–7 mol %.

In addition to the above acrylic ester monomers, methacrylic acid ester monomers, and monomers having an alkoxysilyl group, the acrylic polymer of the present invention may contain less than 40 mol % of other radically polymerizable monomers.

Such radically polymerizable monomers include unsaturated carboxylic acids such as acrylic acid and methacrylic acid, unsaturated amides such as N,N-dimethylacrylamide and N,N-dimethylmethacrylamide, unsaturated ketones such as methyl vinyl ketone, aromatic compounds such as styrene and α-methylstyrene, and the like.

The number average molecular weight of the (meth)acrylic polymer of the present invention, in terms of polystyrene-reduced molecular weight, is from 1,000 to 100,000, and preferably from 1,000 to 20,000.

(3) Polyester

As examples of polyesters, polycondensation products of hydroxycarboxylic acid, ring-opening polymerization products lactones, polycondensation products of an aliphiphatic polyol and an aliphatic polycarboxylic acid.

(4) Polycarbonate

Polycondensation products of a carbonate such as polyethylene carbonate, polypropylene carbonate, polytrimethylene carbonate, polytetramethylene carbonate, polypentamethylene carbonate, or polyhexamethylene carbonate, and alkylene glycol can be given, for example.

(5) Polyanhydride

Polycondensation products of a dicarboxylic acid such as polymalonyl oxide, polyadipoyl oxide, polypimeloyl oxide, polysuberoyl oxide, polyazelayl oxide, polysebacoyl oxide, or the like can be given.

Also included are vinylamide polymers such as poly(N-vinylacetamide), poly(N-vinylpyrrolidone, poly(2-methyl-2-oxazoline), and poly(N,N-dimethylacrylamide); styrene polymers such as polystyrene, polymethylstyrene, and poly-α-methylstyrene; and the like.

The proportion of the compound having a boiling point or decomposition temperature of 250–450° C. which is dissolved or dispersed in the component (A) is usually 1–80 wt %, and preferably 5–65 wt %, of the amount of the component (A) (as a completely hydrolyzed condensate).

The completely hydrolyzed condensate in the present invention is defined as a product in which 100% of the groups shown by —$OR^2$, —$OR^4$, and —$OR^5$ are hydrolyzed to become —OH and are completely condensed.

The curable composition of the present invention may further comprise a compound having a boiling point or decomposition temperature of more than 450° C.

As examples of such a compound having a boiling point or decomposition temperature above 450° C., polyimide compounds having a polyamic acid and/or carboxylic acid anhydride group (such compounds are collectively referred to as "specific polyimides") and polyarylenes can be given.

The polyimides preferably have a carboxylic acid anhydride group, hydrolyzable organosilyl group, and the like.

The polyamic acid in the present invention may not have to be completely imidized. The imidization rate of polyimides is 50% or more, and preferably 90% or more.

These specific polyimides can be obtained by (a) a method of reacting a tetracarboxylic acid dianhydride and a diamine compound using an excess amount of the tetracarboxylic acid dianhydride in an organic solvent to produce a solution of a polyamic acid or (b) a method of subjecting the polyamic acid obtained in the method (a) to a dehydration-decyclization reaction by a thermal or chemical treatment in an organic solvent to produce a solution of polyimide having a carboxylic acid anhydride group. Of these, the method (b) is more preferable.

As specific examples of the tetracarboxylic acid dianhydride used in the method (a),
2,3,2',3'-biphenyltetracarboxylic acid dianhydride,
2,3,3',4'-biphenyltetracarboxylic acid dianhydride,
3,4,3',4'-biphenyltetracarboxylic acid dianhydride,
9,9-bis(2,3-dicarboxyphenyl)fluorene dianhydride,
9,9-bis(3,4-dicarboxyphenyl)fluorene dianhydride,
2,2-bis(2,3-dicarboxyphenyl)-1,1,1,3,3,3-hexafluoropropane dianhydride,
2,2-bis(3,4-dicarboxyphenyl)-1,1,1,3,3,3-hexafluoropropane dianhydride,
9,9-bis[4-(2,3-dicarboxyphenoxy)phenyl]fluorene dianhydride,
9,9-bis[4-(3,4-dicarboxyphenoxy)phenyl]fluorene dianhydride,
2,2-bis[4-(2,3-dicarboxyphenoxy)phenyl]-1,1,1,3,3,3-hexaflu oropropane dianhydride, and
2,2-bis[4-(3,4-dicarboxyphenoxy)phenyl]-1,1,1,3,3,3-hexaflu oropropane dianhydride can be given.

As specific examples of the diamine compounds used in the method (a),
9,9-bis(2-aminophenyl)fluorene,
9,9-bis(3-aminophenyl)fluorene,
9,9-bis(4-aminophenyl)fluorene,
9,9-bis[4-(2-aminophenoxy)phenyl]fluorene,
9,9-bis[4-(3-aminophenoxy)phenyl]fluorene,
9,9-bis[4-(4-aminophenoxy)phenyl]fluorene,
2,2-bis(2-aminophenyl)-1,1,1,3,3,3-hexafluoropropane,
2,2-bis(3-aminophenyl)-1,1,1,3,3,3-hexafluoropropane,
2,2-bis(4-aminophenyl)-1,1,1,3,3,3-hexafluoropropane, 2,2-bis[4-(2-aminophenoxy)phenyl]-1,1,1,3,3,3-hexafluoropro pane,
2,2-bis[4-(3-aminophenoxy)phenyl]-1,1,1,3,3,3-hexafluoropro pane,
2,2-bis[4-(4-aminophenoxy)phenyl]-1,1,1,3,3,3-hexafluoropro pane,
2,2'-diaminodiphenyl ether, 2,3'-diaminodiphenyl ether, 2,4'-diaminodiphenyl ether, 3,3'-diaminodiphenyl ether, 3,4'-diaminodiphenyl ether, 4,4'-diaminodiphenyl ether, 2,2'-diaminobiphenyl, 2,3'-diaminobiphenyl, 2,4-diaminobiphenyl, 3,3'-diaminobiphenyl, 3,4'-diaminobiphenyl, 4,4'-diaminobiphenyl, 4,4'-diamino-2,2'-bis(trifluoromethyl)biphenyl, 2,2'-diamino-4,4'-bis(trifluoromethyl) biphenyl, 2-(3-aminophenyl)-3'-aminophenyl, 2,2'-bis(3-aminophenyl)biphenyl, and 9,9-bis[3-phenyl-4-(4-amino-2-trifluoromethylphenoxy)phenyl]fluorene can be given.

Furthermore, amine compounds having 3 or more amino groups in the molecule may be used together with the diamine compounds.

The following compounds can be given as examples of amine compounds having 3 or more amino groups in the molecule: triamines such as 1,3,5-triaminobenzene, 3,3',5-triaminobiphenyl, 3,3',5-triaminodiphenyl ether, 1,1-bis(4-aminophenyl)-1-(4-aminophenyl)ethane, 1,1-bis(4-aminophenyl)-1-(4-aminophenyl)-2,2,2-trifluoroeth ane, 2-amino-9,9-bis(4-aminophenyl) fluorene, and 2-amino-9,9-bis[4-(4-aminophenoxy)phenyl]fluorene; tetramines such as 9,9-bis(3,4-diaminophenyl)fluorene, 9,9-bis(3,5-diaminophenyl)fluorene, 2,7-diamino-9,9-bis(2-aminophenyl)fluorene, 2,7-diamino-9,9-bis(3-aminophenyl)fluorene, 2,7-diamino-9,9-bis(4-aminophenyl)fluorene, 3,6-diamino-9,9-bis(2-aminophenyl)fluorene, 3,6-diamino-9,9-bis(3-aminophenyl)fluorene, 3,6-diamino-9,9-bis(4-aminophenyl)fluorene, 4,5-diamino-9,9-bis(2-aminophenyl)fluorene, 4,5-diamino-9,9-bis(3-aminophenyl)fluorene, 4,5-diamino-9,9-bis(4-aminophenyl)fluorene, 1,2,4,5-tetraaminobenzene, 3,3',4,4'-tetraaminobiphenyl, bis(3,4-diaminophenyl)methane, bis(3,5-diaminophenyl)methane, 2,2-bis(3,4-diaminophenyl)propane, 2,2-bis(3,4-diaminophenyl)-1,1,1,3,3,3-hexafluoropropane, bis(3,5-diaminophenyl)ether, 2,7-diamino-9,9-bis[3-(2-aminophenoxy)phenyl]fluorene, 2,5-diamino-9,9-bis[3-(3-aminophenoxy)phenyl]fluorene, 2,7-diamino-9,9-bis[3-(4-aminophenoxy)phenyl]fluorene, 3,6-diamino-9,9-bis[3-(2-aminophenoxy)phenyl]fluorene, 3,6-diamino-9,9-bis[3-(3-aminophenoxy)phenyl]fluorene, 3,6-diamino-9,9-bis[3-(4-aminophenoxy)phenyl]fluorene, 4,5-diamino-9,9-bis[3-(2-aminophenoxy)phenyl]fluorene, 4,5-diamino-9,9-bis[3-(3-aminophenoxy)phenyl]fluorene, 4,5-diamino-9,9-bis[3-(4-aminophenoxy)phenyl]fluorene, 2,7-diamino-9,9-bis[4-(2-aminophenoxy)phenyl]fluorene, 2,7-diamino-9,9-bis[4-(3-aminophenoxy)phenyl]fluorene, 2,7-diamino-9,9-bis[4-(4-aminophenoxy)phenyl]fluorene, 3,6-diamino-9,9-bis[4-(2-aminophenoxy)phenyl]fluorene, 3,6-diamino-9,9-bis[4-(3-aminophenoxy)phenyl]fluorene, 3,6-diamino-9,9-bis[4-(4-aminophenoxy)phenyl]fluorene, 4,5-diamino-9,9-bis[4-(2-aminophenoxy)phenyl]fluorene, 4,5-diamino-9,9-bis[4-(3-aminophenoxy)phenyl]fluorene, 4,5-diamino-9,9-bis[4-(4-aminophenoxy)phenyl]fluorene, 9,9-bis[4-(3,5-diaminophenoxy)phenyl]fluorene, 1,3-bis(3,5-diaminophenoxy)benzene, 1,4-bis(3,5-diaminophenoxy)benzene, 2,2-bis[4-(3,5-diaminophenoxy)phenyl]propane, and 2,2-bis[4-(3,5-diaminophenoxy)phenyl]-1,1,1,3,3,3-hexafluor opropane.

There are no specific limitations to the organic solvent used in the above methods (a) or (b) inasmuch as such a solvent is inert to and dissolve the reaction raw materials and the resulting component (B). Examples include non-protonic polar solvent such as dimethylsulfoxide; phenol solvents such as phenol and cresol; and the like. These organic solvents may be used either individually or in combination of two or more.

In the synthesis of polyamic acid using the above method (a), tetracarboxylic acid dianhydrides and diamine compounds are reacted in the amount, in terms of the total concentration of these compounds in the total weight of the liquid mixture, of usually 1–50 wt %, and preferably 2–30 wt %, at a temperature of 150° C. or less, and preferably 0–120° C. In the synthesis of polyimide using the above method (b), the raw materials are reacted by a thermal imidization reaction at a temperature usually of 50–400° C., and preferably 100–350° C., or by a chemical imidization reaction at a temperature usually of 0–200° C.

The carboxylic acid anhydride groups in the specific polyimides of the present invention are usually present on the both terminals of the molecular chain of polyamic acid or polyimide, but these may also be present only on either one of the terminals of molecular chain. The content of carboxylic acid anhydride groups in the component (B) is usually 0.01–30 wt %, preferably 0.05–25 wt %, and particularly preferably 0.1–20 wt %.

The specific polyimide in the present invention may further contain a hydrolyzable silyl group. The following methods can be given as examples of the method for synthesizing the specific polyimide having a hydrolyzable silyl group. (c) A method of adding a silane compound having a carboxylic acid anhydride group and a hydrolyzable group and/or a silane compound having a functional group reactive with a carboxyl group and a hydrolyzable group (these silane compounds are hereinafter collectively referred to as "functional silane compounds") in the condensation polymerization of the tetracarboxylic acid dianhydride and diamine compound. (d) A method of adding functional silane compounds after the condensation polymerization of the tetracarboxylic acid dianhydride and diamine compound, thereby causing the functional silane compounds to react with polyamic acid. (e) A method of subjecting the polyamic acid having a hydrolyzable silyl group obtained by the above method (c) or (d) to a thermal or chemical hydration-decyclization reaction in an organic solvent. (f) A method of adding functional silane compounds after the reaction of the above method (b), thereby causing the functional silane compounds to react with polyimide. (g) A method of using a silane compound having two amino groups and hydrolyzable groups as part of the diamine compound in the method (a). (h) A method of subjecting the polyamic acid having a hydrolyzable silyl group obtained by the above method (f) to a thermal or chemical hydration-decyclization reaction in an organic solvent. The amount of the silane compound having two amino groups and hydrolyzable groups used in the above method (g) is usually 50 mol % or less, and preferably 30 mol % or less, in the total amount of diamine compounds. Of the above methods (d)–(h), the methods (d), (f), and (g) are preferable, with particularly preferable methods being the methods (d) and (f).

The following compounds can be given as examples of the functional silane compound used in the above methods (c), (d), and (f): carboxylic acid anhydride group-containing silanes such as acid anhydride of 3,4-dicarboxyphenyltrimethoxysilane and acid anhydride of 3,4-dicarboxybenzyltrimethoxysilane; mercapto silanes such as mercaptoethyltrimethoxysilane, 2-mercaptoethyltrimethoxysilane, 3-mercaptopropyltrimethoxysilane, and 3-mercaptopropyldimethoxymethylsilane; amino silanes such as 3-aminopropyltrimethoxysilane, 3-aminopropyltriethoxysilane, 3-aminopropyldimethoxymethylsilane, 3-aminopropyldiethoxymethylsilane, 3-aminopropyldimethylmethoxysilane, 3-aminopropyldimethylethoxysilane, (2-aminoethylamino) methyltrimethoxysilane, 3-(2-aminoethylamino)propyltrimethoxysilane, 3-(2-aminoethylamino)propyldimethoxymethylsilane, 3-[2(2-aminoethylamino)ethylamino]propyltrimethoxysilane, N-(3-trimethoxysilylpropyl)urea, N-(3-triethoxysilylpropyl)urea, 2-(2-aminoethylthio)ethyltrimethoxysilane, 2-(2-aminoethylthio)ethyltriethoxysilane, 2-aminophenyltriethoxysilane, 3-aminophenyltrimethoxysilane, 3-aminophenyltriethoxysilane, 4-aminophenyltrimethoxysilane, and 4-aminophenyltriethoxysilane; imino silanes such as bis(3-trimethoxysilylpropyl)amine, bis(3-triethoxysilylpropyl)amine, 3-cyclohexylaminopropyltrimethoxysilane, 3-cyclohexylaminopropyldimethoxymethylsilane, 3-phenylaminopropyltrimethoxysilane, 3-phenylaminopropyldimethoxymethylsilane, 3-benzylaminopropyltrimethoxysilane, 3-benzylaminopropyldimethoxymethylsilane, 3-(p-vinylbenzylamino) propyltrimethoxysilane, 3-(p-vinylbenzylamino) propyldimethoxymethylsilane, 3-allylaminopropyltrimethoxysilane, 3-allylaminopropyldimethoxymethylsilane, 3-piperazinopropyltrimethoxysilane, and 3-piperazinopropyldimethoxymethylsilane; epoxy silanes such as 3-glycidoxypropyltrimethoxysilane, 3-glycidoxypropyltriethoxysilane, 3-glycidoxypropyldimethoxymethylsilane, 3-glycidoxypropyldiethoxymethylsilane, 2-(3,4-epoxycyclohexyl)ethyltrimethoxysilane, and 2-(3,4-epoxycyclohexyl)ethyldimethoxymethylsilane; and isocyanate silanes such as 3-isocyanatepropyltrimethoxysilane, 3-isocyanatepropyltriethoxysilane, 3-isocyanatepropyldimethoxymethylsilane, and 3-isocyanatepropyldiethoxymethylsilane. These functional silane compounds may be used either individually or in combination of two or more.

The logarithmic viscosity [η] (in N-methylpyrrolidone, 30° C., 0.5 g/dl) of the specific polyimide used in the present invention is usually 0.05–5 dl/g, and preferably 0.1–3 dl/g.

In the present invention, the specific polyimides can be used either individually or in combinations of two or more. The proportion of the specific polyimides used in the present invention is in the range of 5–1000 parts by weight, preferably 10–800 parts by weight, and more preferably 15–600 parts by weight, for 100 parts by weight of the component (A).

Other Additives

The film-forming composition of the present invention may further comprise other components such as colloidal silica, colloidal alumina, surfactants, and the like.

Colloidal silica is a dispersion of high purity silicic anhydride in a hydrophilic organic solvent, for example, with a solid content of about 10–40 wt %, wherein silica particles with an average diameter of 5–30 μm, and preferably 10–20 μm, are dispersed. Such colloidal silica is commercially available, for example, as methanol silica sol or iso-propanol silica sol (manufactured by Nissan Chemical Industries, Ltd.) or Oscal™ (manufactured by Catalysts & Chemicals Ind. Co., Ltd.).

The above colloidal alumina is commercially available, for example, as Alumina Sol 520™, Alumina Sol 100™, or Alumina Sol 200™ (manufactured by Nissan Chemical Industries, Ltd.), Alumina Clear Sol™, Alumina Sol 10™, or Alumina Sol 132™ (manufactured by Kawaken Fine Chemicals Co., Ltd.).

As examples of nonionic surfactants, nonionic surfactants, anionic surfactants, cationic surfactants, and amphoteric surfactants can be given. These may be a silicon-containing surfactant, polyalkylene oxide surfactant, poly (meth)acrylate surfactant, or the like.

The total solid content in the curable composition of the present invention may be appropriately adjusted according to the target application, preferably, in the range of 2–30 wt %. The total solid content in the range of 2–30 wt % not only ensures production of a coated film thickness in an appropriate range, but also ensures excellent storage stability of the composition.

It is desirable that the content of alcohols having a boiling point of 100° C. or less in the curable composition be 20 wt % or less, and particularly 5 wt % or less. Alcohols having a boiling point of 100° C. or less may be produced when the compound (A-1) or the compound (A-2) is hydrolyzed and/or condensed. It is desirable to remove such alcohols by distillation or the like so that the content in the curable composition is maintained 20 wt % or less, and preferably 5 wt % or less.

The curable composition of the present invention may further comprise β-diketone represented by the formula $R^{18}COCH_2COR^{19}$ (wherein $R^{18}$ represents an alkyl group having 1–6 carbon atoms such as a methyl group, ethyl group, or propyl group and $R^{19}$ represents an alkyl group having 1–6 carbon atoms such as a methyl group, ethyl group, or propyl group or an alkoxy group having 1–6 carbon atoms such as a methoxy group, ethoxy group, or propoxy group) and/or β-keto ester.

In the present invention, metals in the curable composition and/or raw materials can be removed by casing either one or both of them to passed through the functional filter material.

All components including monomers which are the raw materials of the curable composition, water, organic solvents, catalysts, and the like are passed through the functional filter material, as are or diluted with a solvent (if these are liquid), or dissloved in a solvent (if solid).

The solid concentration in the liquid passed through the functional filter material is preferably 0–70 wt %.

The flow rate of the liquid passed through the functional filter material has no effect on the metal removal efficiency. Usually, the flow rate from 0.0001 to 100 kg/m²·min is applicable.

If the temperature when the above components are passed through the functional filter material is too high, the treated liquid will be adversely affected due to elusion or deterioration of the functional filter material or decomposition of the solvent. If the temperature is too low, the filtration will be inefficient due to a high solid content of the treated liquid. For the above reasons, the temperature is preferably from 0 to 80° C., and still more preferably from 10–50° C.

Silicon wafer, $SiO_2$ wafer, SiN wafer, and the like are given as substrates for coating the curable composition of the present invention. Spin coating, dip coating, roll coating, spray coating, and the like are applicable for the coating operation.

EXAMPLES

The present invention will now be described by way of examples and comparative, which should not be construed as limiting the present invention. The proportions and percentages are shown on the weight basis in the following description.

The following measuring methods were used.

Weight Average Molecular Weight (Mw)

Measured by gel permeation chromatography (GPC) under the following conditions.

Samples: 1 g of the hydrolysis-condensate was dissolved in 100 cc of tetrahydrofuran.

Standard polystyrene: Standard polystyrene manufactured by Pressure Chemical Co. of the U.S. was used.

Appratus: A high temperature high-speed gel osmosis chromatogram (Model 150-CALC/GPC™) manufactured by Waters Co. of the U.S.

Column: SHODEXA-80M™ (length: 50 cm) manufacture by Showa Denko K.K.

Temperature: 40° C.

Flow rate: 1 cc/min.

Relative Dielectric Constant

The curable composition was coated onto an 8-inch silicon wafer by spin coating. The substrate was dried for 2 minutes at 80° C. and for a further 2 minutes at 180° C. on a hot plate, then sintered for 18 minutes at 420° C. in an oven in nitrogen atmosphere. Aluminum vapor was deposited onto the resulting substrate, thereby obtaining a test substrate for evaluation of relative dielectric constant. The relative dielectric constant was calculated from the capacitance at 10 kHz using HP16451B™ electrode and HP4284A™ precision LCR meter (manufactured by Yokokawa-Hewlett Packard Co., Ltd.

Leakage Current

The curable composition was coated onto an 8-inch silicon wafer by spin coating. The substrate was dried for 2 minutes at 80° C. and for a further 2 minutes at 180° C. on a hot plate, then sintered for 18 minutes at 420° C. in an oven in nitrogen atmosphere. Aluminum vapor was deposited onto the resulting substrate, thereby obtaining a test substrate for evaluation of leakage current. The leakage current was determined from the current detected when a voltage of 0.2 MV/cm was applied to the coating using an ampere meter 6517A™ manufactured by Keithley Co., Ltd. The leakage current was evaluated according to the following standard.

Good: The leakage current was less than $1 \times 10^{-10}$ A

Bad: The leakage current was $1 \times 10^{-10}$ A or more

Dielectric Breakdown Voltage

The curable composition was coated onto an 8-inch silicon wafer by spin coating. The substrate was dried for 2 minutes at 80° C. and for a further 2 minutes at 180° C. on a hot plate, then sintered for 18 minutes at 420° C. in an oven in nitrogen atmosphere. Aluminum vapor was deposited onto the resulting substrate, thereby obtaining a test substrate for evaluation of dielectric breakdown voltage. The dielectric breakdown voltage was judged from the current measured when a voltage of 0–10 MV/cm was applied to the coating using an ampere meter 6517A™ manufactured by Keithley Co., Ltd. The dielectric breakdown voltage was evaluated according to the following standard.

Good: The dielectric breakdown voltage was 3.5 MV/cm or more.

Bad: The dielectric breakdown voltage was less than 3.5 MV/cm.

Metal Content in the Solution

Measured using the atomic absorption spectroscopy method

Example 1

(1) 203 parts (100 parts as condensate) of methyl trimethoxysilane (MTMSi) as alkylalkoxysilane, 0.7 part (1.3 mmol) of di-iso-propoxy titanium bis-ethylacetylacetate (DIPTiEAA, purity: 78%) as a metal chelate compound, and 250 parts of propylene glycol monopropyl ether (PFG) an organic solvent were mixed and heated to 60° C. A mixture of 40 parts of ion exchange water (corresponding to 0.5 mol per one mol of the methoxy group in methyltrimethoxysilane) and 50 parts of PFG were added while stirring the mixture at for one hour at 60° C. The mixture was reacted for 10 hours at 60° C. After the addition of 27 parts of acetylacetone (AcAc), 145 parts of solvents including methanol were removed at 40° C. under reduced pressure, thereby obtaining a curable composition.

(2) 500 ml of the composition obtained in (1) above was passed through a potential-producing filter material, Zeta-Plus SH™ filter (manufactured by CUNO K.K.) made from the composite materials containing cellulose, diatomite, and pearlite, a cation exchange resin (sulfonated polystyrene crosslinked with divinylbenzene) and a cation charge modifier (a polyamide polyamine epichlorohydrin resin) in the form of a disk with a diameter of 47 mm and thickness of 3 mm, at 20° C. at a flow rate of 0.45 kg/m$^2$·min.

The metal content of the curable composition was measured by an atomic absorption spectrophotometer before and after the treatment. The metal content before the treatment was Na: 248 ppb, Fe: 35.5 ppb, Li: 4.2 ppb, K: 3.2 ppb, Ca: 25 ppb, and Cu: 5.3 ppb, and after the treatment was Na: 15 ppb, Fe: 5.5 ppb, K: 2.2 ppb, Ca: 3.2 ppb, and Cu: 2.2 ppb.

Example 2

(1) Methyltrimethoxysilane was passed through Zeta-Plus GN™ filter, which produces a zeta potential, but does not contain an ion exchanger material nor a chelate-forming material (manufactured by CUNO K.K., made from a composite material containing cellulose, diatomite, and pearlite, and a polyamide polyamine epichlorohydrin resin as the cation charge modifier, in the form of a disk with a diameter of 47 mm and a thickness of 3 mm), packed in a stainless steel column with a diameter of 50 mm and a length of 20 cm, at 20° C. at a flow rate of 0.45 kg/m$^2$·min.

(2) A curable composition was prepared in the same manner as in Example 1(1) except for using 203 parts (100 parts as condensate) of the MTMSi treated in (1) above.

The metal content of the resulting curable composition was Na: 3 ppb, Fe: 2.1 ppb, Li: 5.5 ppb, K: 2.0 ppb, Ca: 1.9 ppb, and Cu: 1.5 ppb.

Example 3

(1) Tetramethoxysilane, methyltrimethoxysilane, propylene glycol monomethyl ether, polyoxyethylene(PEO)-polyoxypropylene(PPO)-polyoxyethylene(PEO) block copolymer (New Pole62™ manufactured by Sanyo Chemical Industries, Ltd. (having a structure of HO-PEO$_5$-PPO$_{30}$-PEO$_5$-OH)), and water were separately passed through a functional filter material, Zeta-Plus SH™ filter (manufactured by CUNO K.K.), made from the composite materials containing cellulose, diatomite, and pearlite, a cation exchange resin (sulfonated polystyrene crosslinked with divinylbenzene) and a cation charge modifier (a polyamide polyamine epichlorohydrin resin) in the form of a disk with a diameter of 47 mm and thickness of 3 mm, at 20° C. at a flow rate of 0.45 kg/m$^2$·min.

(2) An aqueous solution of 1.0 g of oxalic acid in 157.7 g of water passed through the same functional filter material as above at 20° C. at a flow rate of 0.45 kg/m$^2$·min.

(3) 158 g of the aqueous solution of oxalic acid treated in (2) above was added dropwise to a mixture of 152.0 g of tetramethoxysilane (60.0 gas a complete hydrolysis-condensate), 284.1 g methyltrimethoxysilane (140.0 g as a complete hydrolysis-condensate), and 798.8 g of propylene glycol monomethyl ether, which were treated in (1) above, at room temperature in one hour. After the addition, the mixture was allowed to react at 60° C. for two hours and concentrated under reduced pressure to a weight of 1,000 g, thereby obtaining polysiloxane sol with a solid content of 20%.

(4) 8.6 g of the polyoxyethylene-polyoxypropylene-polyoxyethylene block copolymer (New Pole 62™ manufactured by Sanyo Chemical Industries, Ltd., having a structure of HO-PEO$_5$-PPO$_{30}$-PEO$_5$-OH) treated in (1) above was added to 100 g (20 g as solid content) of the polysiloxane sol obtained in (3) above to obtain a curable composition.

The metal content of the resulting curable composition was Na: 4 ppb, Fe: 3.3 ppb, Li: 5.1 ppb, K: 1.8 ppb, Ca: 1.8 ppb, and Cu: 1.2 ppb.

Example 4

(1) A nitrogen stream was fed through a vessel equipped with a stirrer, a reflux condenser, and a nitrogen introducing pipe. The vessel was charged with 77.28 g of N,N-dimethylformamide, following which 7.99 g (15 mmol) of 9,9-bis[4-(4-aminophenoxy)-phenyl]fluorenea and 0.293 g (0.52 mmol) of 2,7-diamino-9,9-bis[4-(4-aminophenoxy)phenyl]fluorene were added and thoroughly dissolved. After the addition of 5.36 g (18 mmol) of 2,2,3,3-biphenyltetracarboxylic acid dianhydride, the mixture was reacted at room temperature for 5 hours while stirring to obtain a solution of polyamic acid.

77.28 g of N,N-dimethylformamide, 8.8 ml of pyridine, and 6.9 ml of acetic anhydride were added to the solution of polyamic acid, and the mixture was stirred for one hour at room temperature and for 4 hours at 100° C. The reaction solution was added to 800 ml of diethyl ether to collect the deposited solid by filtration. The collected solid was dried to obtain 13.50 g of polyimide.

(2) A mixture of 1.57 g of the polyimide obtained in (1) above, 19.09 g of 3-methoxymethylpropionate, and 16.57 g of γ-butyrolactone was reacted for one hour at 60° C. Then, 6.36 g methyltrimethoxysilane was added to the mixture. A mixture of 0.016 g of maleic acid, 1.26 g of ion exchanged water, and 2.52 g of γ-butyrolactone was added to the reaction solution in 6 portions over one hour while controlling the temperature at 60° C. The resulting mixture was reacted for a further one hour at 60° C. to obtain a curable composition.

(3) The curable composition obtained in (2) above was passed through a functional filter material containing a cation exchange resin, Zeta-Plus SH™ filter (manufactured by CUNO K.K., containing cellulose, diatomite, and pearlite as the composite materials and a polyamide polyamine epichlorohydrin resin as the cation charge modifier; a disk with a diameter of 47 mm and thickness of 3 mm) at 20° C. at a flow rate of 0.35 kg/m$^2$·min.

The metal content of the resulting curable composition was Na: 8 ppb, Fe: 4 ppb, Li: 6.5 ppb, K: 2.8 ppb, Ca: 2.6 ppb, and Cu: 3.3 ppb.

Synthesis Example 1

A three-necked flask was charged with 7.5 g of sodium iodide, 1.3 g of anhydrous nickel chloride, 15.7 g of triphenylphosphine, 19. 6 g of zinc powder activated by acetic acid, and 16.7 g of 9,9-bis(methylsulfonyloxy)fluorene. After drying the mixture for 24 hours under vacuum, argon gas was filled into the three-necked flask. Then, 50 ml of N,N-dimethylformamide, 50 ml of dry tetrahydrofuran, and 10.8 g of 2,4-dichlorotoluene were added. The mixture was stirred in an argon gas stream at 70° C. to observe the reaction mixture turning brown. The mixture was allowed to react at 70° C. for 20 hours. The resulting reaction mixture was poured into a mixed solution of 400 ml of 36% hydrochloric acid and 1,600 ml of methanol to collect precipitate.

The precipitate obtained was suspended in chloroform and extracted from a 2 N hydrochloric acid aqueous solution. The chloroform layer was added to methanol to recover precipitate, which was dried to obtain polymer (1) in the form of a white powder with a weight average molecular weight of 10,300.

Synthesis Example 2

A three-necked flask equipped with a nitrogen gas tube, a Dean Stark, and a condenser was charged with 26.48 g of 9,9-bis(4-hydroxyphenyl)fluorene, 28.35 g of 9,9-bis(4-hydro-3-methylxyphenyl)fluorene, 45.60 g of anhydrous potassium carbonate, 500 ml of dimethyl acetamide, 150 ml of toluene. The mixture was heated at 140° C. for 3 hours in a nitrogen atmosphere. After removal of water produced during formation of the salt and an excess amount of toluene, the reaction mixture was allowed to cool to room temperature. 32.73 g of 4,4'-difluorobenzophenone was added to the reaction mixture, followed by reaction at 165° C. for 10 hours. After cooling, the reaction mixture was poured into 5 l of a 10% HCl alcohol solution to obtain precipitate. The precipitate was collected by filtration, washed thoroughly with ion exchanged water, and preliminary dried in a vacuum oven. The dry precipitate was dissolved again in tetrahydrofuran to recover an insoluble portion, which was re-precipitated in methanol. Reprecipitaion was again repeated to purify the polymer. The resulting polymer was dried in an vacuum oven at 80° C. for 12 hours. Polymer (2) in the form of a white powder with a weight average molecular weight of 150,000 was obtained in this manner.

Example 5

20 g of polymer (1) obtained in Synthesis Example 1 was dissolved in 180 g of cyclohexanone.

This solution was passed through a functional filter material, Zeta-Plus SH™ filter (manufactured by CUNO K.K.), made from the composite materials containing cellulose, diatomite, and pearlite, a cation exchange resin (sulfonated polystyrene crosslinked with divinylbenzene)

and a cation charge modifier (a polyamide polyamine epichlorohydrin resin) in the form of a disk with a diameter of 47 mm and thickness of 3 mm, at 20° C. at a flow rate of 0.45 kg/m²·min.

The metal content of the curable composition before and after the treatment was measured by atomic absorption spectrophotometry. The results are shown in Table 1. A coating was prepared using the solution after treatment to confirm excellent electric characteristics (relative dielectric constant: 2.83, leakage current: 0.6×10⁻¹⁰ A, dielectric breakdown voltage: 3.9 MV/cm).

Example 6

A curable composition was prepared in the same manner as in Example 5, except for using polymer (2) obtained in Synthesis Example 2 instead of the polymer (1). The curable composition and a coating prepared therefrom were evaluated. The evaluation results are shown in Table 1.

Example 7

The curable composition was prepared in the same manner as in Example 5, except for using a commercially available polyarylene ether solution SiLK I™ (manufactured by Dow Chemical Co.) instead of the polymer (1). The curable composition and a coating prepared therefrom were evaluated. The evaluation results are shown in Table 1.

Example 8

The curable composition was prepared in the same manner as in Example 5, except for using a commercially available polyarylene ether solution FLARE™ 2.0 (manufactured by Honeywell Co.) instead of the polymer (1). The curable composition and a coating prepared therefrom were evaluated. The evaluation results are shown in Table 1.

Although the coating showed a low relative dielectric constant of 2.89, exhibited only poor electric characteristics in terms of leakage current (6.2×10⁻¹⁰ A) and dielectric breakdown voltage (3.2 MV/cm).

Comparative Example 2

The cured composition solution and the coating made therefrom were evaluated in the same manner as in Example 2, except that the coating was prepared using the solution before treatment.

Although the coating showed a low relative dielectric constant of 2.98, exhibited only poor electric characteristics in terms of leakage current (9.4×10⁻¹⁰ A) and dielectric breakdown voltage (3.1 MV/cm).

Because the curable composition prepared by the method of the present invention has a very small content of alkali metals and heavy metals, the composition is suitably used for the manufacture of materials for forming insulating films.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of manufacturing an insulating film-forming material comprising: treating a curable composition which comprises (A) a polymer selected from the group consisting of a hydrolysis condensate of at least one compound selected from the group consisting of compounds (A-1) and (A-2) which are respectively the following formulas (1) or (2):

$$R^1{}_a Si(OR^2)_{4-a} \qquad (1)$$

wherein R is a hydrogen atom, a fluorine atom, or a monovalent organic group, $R^2$ is a monovalent organic group, and a is an integer from 0 to 2,

TABLE 1

| | | Metal content (ppb) | | | | | | Relative dielectric constant | Leakage current (A) | Dielectric breakdown voltage (MV/cm) |
|---|---|---|---|---|---|---|---|---|---|---|
| | | Na | Li | K | Ca | Fe | Cu | | | |
| Example 5 | Before treatment | 520 | 120 | 50 | 240 | 550 | 30 | — | — | — |
| | After treatment | 1.1 | 0.5 | 0.2 | 1.2 | 2.4 | 0.7 | 2.83 | 0.6 × 10⁻¹⁰ | 3.9 |
| Example 6 | Before treatment | 520 | 120 | 50 | 240 | 550 | 30 | — | — | — |
| | After treatment | 1.1 | 0.5 | 0.2 | 1.2 | 2.4 | 0.7 | 2.92 | 0.6 × 10⁻¹⁰ | 3.9 |
| Example 7 | Before treatment | 5.2 | 2.7 | 1.5 | 3.3 | 11 | 3.8 | — | — | — |
| | After treatment | 0.7 | 0.2 | 0.2 | 0.6 | 0.8 | 0.6 | 2.67 | 0.5 × 10⁻¹⁰ | 4.2 |
| Example 8 | Before treatment | 6.2 | 1.3 | 2.2 | 5.3 | 7.3 | 4.1 | — | — | — |
| | After treatment | 0.8 | 0.5 | 0.3 | 0.8 | 1.1 | 1.0 | 2.73 | 0.6 × 10⁻¹⁰ | 3.8 |

Comparative Example 1

The cured composition solution and the coating made therefrom were evaluated in the same manner as in Example 1, except that the coating was prepared using the solution before treatment.

$$R^3{}_b(R^4O)_{3-b}Si\!-\!(R^7)_d\!-\!Si(OR^5)_{3-c}R^6{}_c \qquad (2)$$

wherein $R^3$, $R^4$, $R^5$, and $R^6$ individually are a monovalent organic group, b and c individually are an integer from 0 to 2, $R^7$ is an oxygen atom or a group —(CH₂)ₙ—, wherein n is an integer from 1 to 6, and d is 0 or 1, aromatic polyarylenes and aromatic polyarylene ethers and (B) an organic solvent or mixtures of organic solvents with a zeta potential-producing filter material.

2. The method according to claim 1, wherein said zeta potential-producing filter material is filter material selected from the group consisting of cotton, pulp, cellulose, diatomite, pearlite, activated carbon, and zeolite with a cation charge modifier added thereto.

3. The method according to claim 1, wherein said zeta potential-producing filter material is used together with an ion exchanger material or a chelate-forming material, or both.

4. The method according to claim 1, wherein said curable composition further comprises (C) a compound having a boiling point or decomposition temperature of 250–450° C.

5. The method according to claim 1, wherein said curable composition further comprises (D) a compound having a boiling point or decomposition temperature of above 450° C.

6. The method according to claim 1, wherein said curable composition further comprises (E) a surfactant.

7. The method of manufacturing an insulating film-forming material comprising a curable composition which comprises (A) a polymer selected from the group consisting of a hydrolysis condensate of at least one compound selected from the group consisting of compounds (A-1) and (A-2) which are respectively the following formulas (1) or (2):

$$R^1{}_a Si(OR^2)_{4-a} \quad (1)$$

wherein R is a hydrogen atom, a fluorine atom, or a monovalent organic group, $R^2$ is a monovalent organic group, and a is an integer from 0 to 2, $$R^3{}_b(R^4O)_{3-b}Si-(R^7)_d-Si(OR^5)_{3-c}R^6{}_c \quad (2)$$
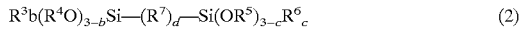

wherein $R^3$, $R^4$, $R^5$, and $R^6$ individually are a monovalent organic group, b and c individually are an integer from 0 to 2, $R^7$ is an oxygen atom or a group $-(CH_2)_n-$, wherein n is an integer from 1 to 6, and d is 0 or 1, aromatic polyarylenes and aromatic polyarylene ethers and (B) an organic solvent or mixtures of organic solvents comprising:
providing (B) said polymer,
treating said polymer with a zeta potential-producing filter material, and
producing said curable composition from (A) the resulting polymer and (B) said organic solvent or said mixtures of said inorganic solvents.

8. A method of manufacturing an insulating film-forming material comprising a curable composition which comprises (A) a polymer selected from the group consisting of a hydrolysis condensate of at least one compound selected from the group consisting of compounds (A-1) and (A-2) which are respectively the following formulas (1) or (2):

$$R^1{}_a Si(OR^2)_{4-a} \quad (1)$$

wherein R is a hydrogen atom, a fluorine atom, or a monovalent organic group, $R^2$ is a monovalent organic group, and a is an integer from 0 to 2, $$R^3{}_b(R^4O)_{3-b}Si-(R^7)_d-Si(OR^5)_{3-c}R^6{}_c \quad (2)$$
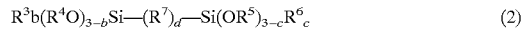

wherein $R^3$, $R^4$, $R^5$, and $R^6$ individually are a monovalent organic group, b and c individually are an integer from 0 to 2, $R^7$ is an oxygen atom or a group $-(CH_2)_n-$, wherein n is an integer from 1 to 6, and d is 0 or 1, aromatic polyarylenes and aromatic polyarylene ethers and (B) an organic solvent or mixtures of organic solvents comprising:
providing (A) said polymer,
treating said polymer with a zeta potential-producing filter material,
producing (A) said polymer from raw materials, and
producing said curable composition from (A) the resulting polymer and (B) said organic solvent or said mixtures of said inorganic solvents.

9. The method of manufacturing an insulating film-forming material comprising a curable composition which comprises (A) a polymer selected from the group consisting of organic polymers, excluding homopolymers and copolymers of vinyl phenol, and inorganic polymers, a hydrolysis condensate of at least one compound selected from the group consisting of compounds (A-1) and (A-2) which are respectively the following formulas (1) or (2):

$$R^1{}_a Si(OR^2)_{4-a} \quad (1)$$

wherein R is a hydrogen atom, a fluorine atom, or a monovalent organic group, $R^2$ is a monovalent organic group, and a is an integer from 0 to 2, $$R^3{}_b(R^4O)_{3-b}Si-(R^7)_d-Si(OR^5)_{3-c}R^6{}_c \quad (2)$$

wherein $R^3$, $R^4$, $R^5$, and $R^6$ individually are a monovalent organic group, b and c individually are an integer from 0 to 2, $R^7$ is an oxygen atom or a group $-(CH_2)_n-$, wherein n is an integer from 1 to 6, and d is 0 or 1, aromatic polyarylenes and aromatic polyarylene ethers and (B) an organic solvent or mixtures of organic solvents comprising:
providing (B) said organic solvent or said mixtures of said organic solvents,
treating said organic solvent or said mixtures of said organic solvents with a zeta potential-producing filter material, and
producing said curable composition form (B) said organic solvent or said mixtures of said organic solvents and (A) said polymer.

10. The method according to claim 1, wherein said filter contains a cation charge modifier.

11. The method according to claim 1, wherein said filter has a thickness from 0.01 to 10cm and a pore diameter of from 0.05 to 10.0 μm.

12. The method according to claim 1, wherein said monovalent organic group is selected from the group consisting of alkyl groups, aryl groups, allyl groups and glycidyl groups.

* * * * *

UNITED STATES PATENT AND TRADEMARK OFFICE
CERTIFICATE OF CORRECTION

PATENT NO. : 6,642,352 B2
DATED : November 4, 2003
INVENTOR(S) : Hidenori Suzuki et al.

It is certified that error appears in the above-identified patent and that said Letters Patent is hereby corrected as shown below:

Column 25,
Line 23, "The method" should read -- A method --;
Line 46, "providing (B)" should read -- providing (A) --.

Column 26,
Line 11, "providing (A)" should read -- providing monomer(s) for producing (A) --;
Line 14, "from raw materials" should read -- from said raw materials --.

Signed and Sealed this

Thirteenth Day of January, 2004

JON W. DUDAS
*Acting Director of the United States Patent and Trademark Office*